(12) United States Patent
Nishida et al.

(10) Patent No.: US 7,484,853 B2
(45) Date of Patent: Feb. 3, 2009

(54) LIGHT SOURCE DEVICE AND PROJECTOR

(75) Inventors: Kazuhiro Nishida, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 365 days.

(21) Appl. No.: 11/357,056

(22) Filed: Feb. 21, 2006

(65) Prior Publication Data
US 2006/0187662 A1 Aug. 24, 2006

(30) Foreign Application Priority Data
Feb. 21, 2005 (JP) ............................ 2005-043530
Nov. 10, 2005 (JP) ............................ 2005-325727

(51) Int. Cl.
*G03B 21/28* (2006.01)
*F21V 7/00* (2006.01)

(52) U.S. Cl. ........................ 353/99; 362/298; 362/346

(58) Field of Classification Search ................ 353/98, 353/99; 362/296, 297, 298, 341, 346, 347, 362/349
See application file for complete search history.

(56) References Cited

U.S. PATENT DOCUMENTS

| 5,491,525 | A * | 2/1996 | Yamasaki et al. | 353/98 |
| 7,001,027 | B2 * | 2/2006 | Fujisawa et al. | 353/98 |
| 7,040,768 | B2 * | 5/2006 | Fujisawa et al. | 353/99 |
| 7,044,609 | B2 * | 5/2006 | Fujisawa et al. | 353/99 |
| 7,059,746 | B2 * | 6/2006 | Takezawa | 362/252 |
| 7,188,973 | B2 * | 3/2007 | Katsuma | 362/293 |
| 7,213,928 | B2 * | 5/2007 | Takezawa et al. | 353/99 |
| 7,232,241 | B2 * | 6/2007 | Takezawa | 362/302 |
| 7,252,410 | B2 * | 8/2007 | Akiyama | 362/296 |
| 7,329,011 | B2 * | 2/2008 | Kobayashi et al. | 353/99 |
| 7,344,257 | B2 * | 3/2008 | Terashima et al. | 353/102 |
| 2004/0257813 | A1 | 12/2004 | Takezawa | |
| 2005/0128440 | A1 * | 6/2005 | Akiyama | 353/99 |

(Continued)

FOREIGN PATENT DOCUMENTS

| EP | 1 462 850 A1 | 9/2004 |
| JP | A-08-064180 | * 3/1996 |
| JP | A 09-120067 | 5/1997 |
| JP | A 2005-005183 | 1/2005 |

*Primary Examiner*—William C. Dowling
(74) *Attorney, Agent, or Firm*—Oliff & Berridge, PLC

(57) ABSTRACT

A light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed in a stepped manner with respect to the sub-reflecting portion.

17 Claims, 6 Drawing Sheets

U.S. PATENT DOCUMENTS

| | | | |
|---|---|---|---|
| 2005/0157501 A1* | 7/2005 | Akiyama et al. | 362/299 |
| 2005/0213327 A1* | 9/2005 | Kobayashi et al. | 362/261 |
| 2006/0056184 A1* | 3/2006 | Takezawa et al. | 362/299 |
| 2006/0285088 A1* | 12/2006 | Kimura et al. | 353/98 |
| 2007/0041087 A1* | 2/2007 | Kanaya | 359/359 |
| 2008/0048563 A1* | 2/2008 | Takezawa et al. | 313/567 |

* cited by examiner

LIGHT SOURCE DEVICE AND PROJECTOR

CROSS-REFERENCE TO RELATED APPLICATION

The present application claims priority to Japanese Patent Application No. 2005-043530 filed Feb. 21, 2005 and No. 2005-325727 filed Nov. 10, 2005, which are hereby expressly incorporated by reference herein in its entirety.

BACKGROUND

1. Technical Field

The present invention relates to a light source device generating illumination light and a projector having the light source device therein.

2. Related Art

In the related art, a projector that modulates light emitted from a light source in accordance with image information so as to project an optical image in an enlarged manner has been used for the purpose of presentation or a home theater. A light source device of the related art used for the projector typically includes a light emitting tube with a high pressure mercury lamp, a reflector having light emitted from the light emitting tube converging at a predetermined position, and an auxiliary reflecting mirror having the light emitted from the light emitting tube sent back into the light emitting tube (see JP-A-2005-5183). In the light source device, the light can be efficiently used due to the auxiliary reflecting mirror. However, in the light source device, since some of light, which are emitted from the light emitting portion to pass through a boundary between a light emitting portion and a sealed portion, are refracted depending on the shape of a material of the tube at the boundary, it is not easy to accurately control the light reflected from, in particular, a base portion of the auxiliary reflecting mirror so as to send the light back to the light emitting portion between electrodes. For this reason, some of the light reflected from the auxiliary reflecting mirror are incident on the electrodes or the vicinity thereof, which causes the light emitting tube to be overheated or the electrodes to be deteriorated. As a result, the lifetime of the light emitting tube may be shortened.

SUMMARY

An advantage of some aspects of the invention is that it provides a light source device capable of preventing the lifetime of a light emitting tube from being shortened due to light returning from a sub-reflecting mirror.

Further, another advantage of exemplary of the invention is that it provides a high-performance projector having the light source device therein.

According to a first aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed to have a shape stepped with respect to the sub-reflecting portion.

In the light source device, since the base portion is provided to the sub-reflecting mirror for sending light emitted from the light emitting portion back to the light emitting portion and the base portion is formed to have the shape stepped with respect to the sub-reflecting portion, the light which is emitted from the light emitting portion and enters the base portion can be suppressed from being sent back to the light emitting portion and the vicinity thereof. Even though it is not easy for the base portion to send the light back to the light emitting portion between the electrodes because the base portion is provided at the side of the second sealed portion of the sub-reflecting portion, the base portion can positively suppress the light from being sent back to the light emitting portion, so that it is possible to prevent the light from being incident on the electrodes or the vicinity thereof. As a result, it is possible to prevent the temperature of the light emitting tube from rising and the electrodes from being deteriorated, which extends the lifetime of the light emitting tube.

Further, according to a second aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed with a curved surface having curvature different from the sub-reflecting portion. In this case, since the light emitted from the light emitting tube is reflected by the base portion so as to deviate from the light emitting portion and the vicinity thereof, the light incident on the base portion can be effectively sent toward, for example, the front side of the sub-reflecting mirror.

Furthermore, according to a third aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed with a curved surface having a center different from the sub-reflecting portion. In this case, since the light emitted from the light emitting tube is reflected by the base portion so as to deviate from the light emitting portion and the vicinity thereof, the light incident on the base portion can be effectively sent toward, for example, the front side of the sub-reflecting mirror.

Furthermore, according to a fourth aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and transmitting light. In this case, the light incident on the base portion can be effectively discharged toward, for example, the rear side of the sub-reflecting mirror.

Furthermore, according to a fifth aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and diffusing light. In this case, since the light incident on the base portion can be diffused in a random manner, the light is uniformly emitted from the light source device.

Furthermore, according to a sixth aspect of the invention, a light source device includes: a light emitting tube having a light emitting portion that generates light by an electric discharge between a pair of electrodes and first and second sealed portions provided on either side of the light emitting portion; a main reflecting mirror provided along the first sealed portion of the light emitting tube and having a main reflecting portion that reflects light radiated from the light emitting tube so as to converge at a predetermined position; and a sub-reflecting mirror provided along the second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and preventing light radiated from the light emitting tube from being sent back to the light emitting portion and the vicinity thereof. In this case, since the light incident to the base portion can be prevented from being sent back to the light emitting portion and the vicinity thereof, it is possible to prevent the temperature of the light emitting tube from rising and the electrodes from being deteriorated, which results in extending the lifetime of the light emitting tube.

In the invention, preferably, the sub-reflecting mirror further includes a supporting portion fixed around the second sealed portion, and the base portion is formed between the sub-reflecting portion and the supporting portion in a circular shape. In this case, it is possible to easily support the overall sub-reflecting mirror at the second sealed portion with the second sealed portion as an axis.

Further, according to a seventh aspect of the invention, a projector includes: any one of the light source devices described above; an optical modulator that modulates light emitted from the light source device in accordance with inputted image information so as to form modulated light; and a projection optical system projecting the modulated light from the optical modulator as image light.

In the projector, it is possible to project the modulated light formed by the optical modulator onto a screen as image light. At this time, since the light source device, which is bright and has long lifetime deteriorating slowly, is used, bright and clear images can be projected for a long time.

Further, in the projector described above, preferably, the optical modulator further includes: optical modulation units corresponding to respective colors so as to modulate respective color light components; color-separation optical system that splits light emitted from the light source device into the respective color light components so as to be guided to the optical modulation units corresponding to the respective colors; and a color-combining optical system combining respective modulated light components modulated by the optical modulation units corresponding to the respective colors. The projection optical system projects image light combined by the color-combining optical system. In this case, it is possible to project a color image obtained by combining the respective modulated color light components formed by the plurality of optical modulation units.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to a first embodiment of the invention will be described with reference to the accompanying drawings.

First Embodiment

Figure 1:
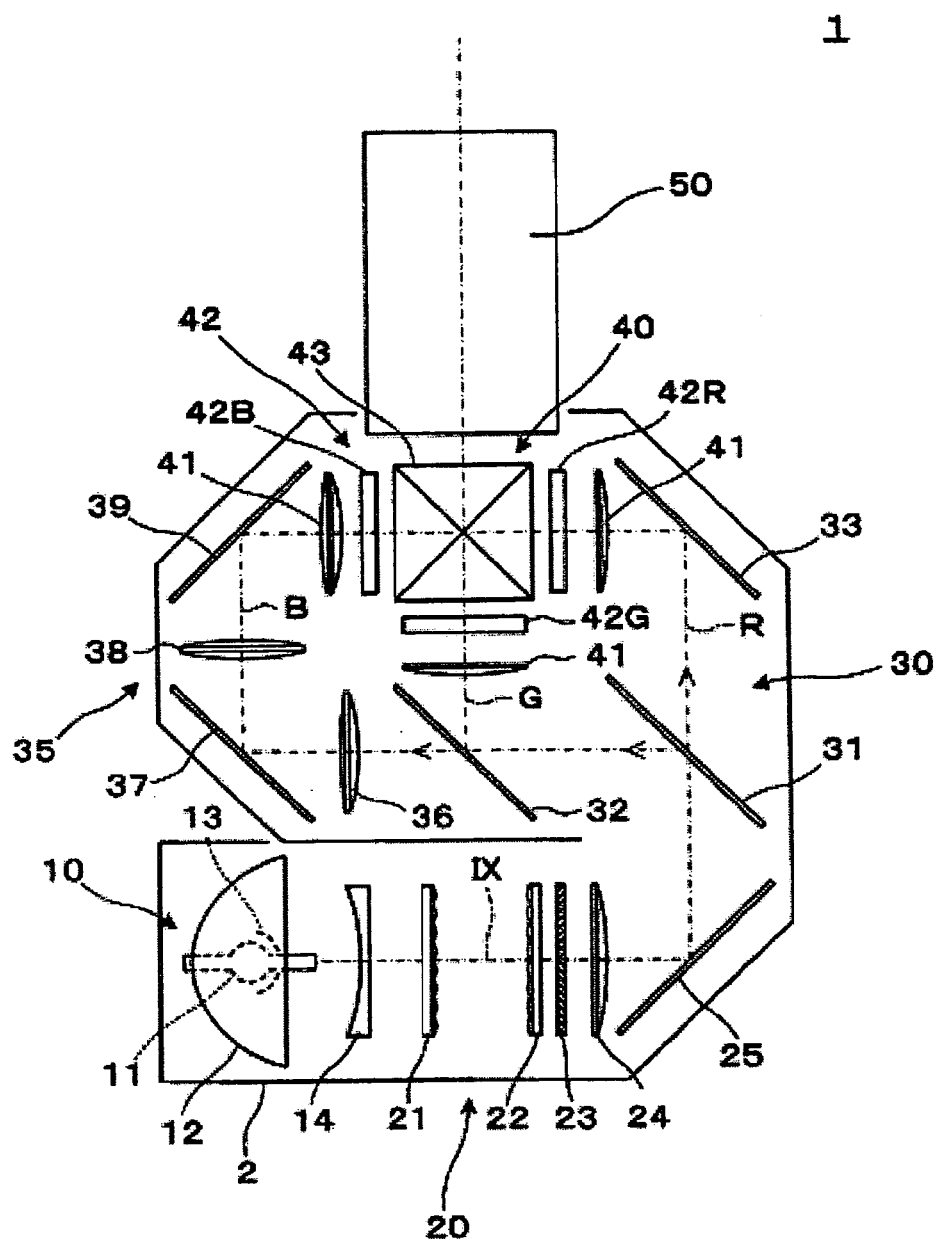
FIG. 1 is a view illustrating an optical system of a projector according to a first embodiment.

FIG. 1 is a view schematically illustrating an optical system of a projector 1 according to a first embodiment of the invention. The projector 1 is an optical apparatus that modulates light emitted from a light source in accordance with image information so as to form an optical image and projects the optical image onto a screen in an enlarged manner, which includes a light source lamp unit 10 serving as a light source device, a uniform-illumination optical system 20, a color-separation optical system 30, a relay optical system 35, an optical device 40, and a projection optical system 50. Optical elements of the optical systems 20, 30, and 35 are positioned to be accommodated in an optical component casing 2 in which a predetermined illumination optical axis IX is set.

The projector 1 has a plurality of fans (not shown) and a cooling mechanism cooling the light source lamp unit 10 and the optical systems 20, 30, and 35 by the fans.

The light source lamp unit 10 converges and emits light radiated from a light source lamp 11 so as to illuminate the optical device 40 through the optical systems 20, 30, and 35. As will be described in detail later, the light source lamp unit 10 includes the light source lamp 11 which serves as a light-emitting tube, a main reflecting mirror 12 which is an ellipsoidal reflector, a sub-reflecting mirror 13 having a spherical shape, and a parallelizing concave lens 14.

The light radiated from the light source lamp 11 is emitted as convergent light, which converges toward the front side of the device, that is, the front side of the device in the light-emission direction, by the main reflector 12, and then is parallelized by the parallelizing concave lens 14 to be emitted toward the uniform-illumination optical system 20.

The uniform-illumination optical system 20 splits the light emitted from the light source lamp unit 10 into a plurality of sub-beams so as to make uniform the in-plane luminance of an area to be illuminated, which includes a first lens array 21, a second lens array 22, a PBS array 23, a condenser lens 24, and a reflecting mirror 25.

The first lens array 21 is a light-beam splitting optical element for splitting the light emitted from the light source lamp 11 into a plurality of sub-beams, which includes a plurality of small lenses arranged in a matrix in a plane perpendicular to the illumination optical axis IX, and the profiles of the respective small lenses are substantially similar to the shape of each image formation area of liquid crystal panels 42R, 42G, and 42B included in the optical device 40 to be described below.

The second lens array 22 is an optical element for condensing the plurality of sub-beams split by the first lens array 21 and also includes a plurality of small lenses arranged in a matrix in a plane perpendicular to the illumination optical axis IX in the same manner as the first lens array 21. However, since the second lens array 22 is to condense the light, it is not necessary that the profiles of the respective small lenses correspond to the shape of the image formation area of each of the liquid crystal panels 42R, 42G, and 42B.

The PBS array 23 is a polarization-converting element for aligning the polarization direction of the respective sub-beams split by the first lens array 21 into a uniform linear polarization. Although not shown, the PBS array 23 has an alternating arrangement of polarization separating films and reflecting mirrors disposed to be inclined with respect to the illumination optical axis IX. The polarization separating film transmits one of P polarized light and S polarized light contained in the respective sub-beams and reflects the other polarized light. The other reflected polarized light is bent by the reflecting mirror to be emitted in the emission direction of the transmitted polarized light, i.e., in the direction along the illumination optical axis IX. Either one of the emitted polarized light is polarization-converted by a retardation plate provided on the light-emission surface of the PBS array 23 so that the polarization direction of all of the polarized light are aligned. With the use of the PBS array 23, the light emitted from the light source lamp 11 can be aligned in a single polarization direction, thereby improving the utilization rate of light source beams used in the optical device 40.

The condenser lens 24 is an optical element for condensing the plurality of sub-beams having passed through the first lens array 21, the second lens array 22, and the PBS array 23 so as to superpose the sub-beams on the image formation area of the liquid crystal panels 42R, 42G, and 42B. The condenser lens 24 is a spherical lens having a flat surface on the incident-side of the light-transmission area and a spherical surface on the emission side in the present embodiment, but an aspherical lens having hyperboloid emission surface may be used.

The light emitted from the condenser lens 24 is bent by the reflecting mirror 25 to be emitted toward the color-separation optical system 30.

The color-separation optical system 30 has two dichroic mirrors 31 and 32 and a reflecting mirror 33, and separates the plurality of sub-beams emitted from the uniform-illumination optical system 20 into three color light components of red (R), green (G), and blue (B) using the dichroic mirrors 31 and 32.

The dichroic mirrors 31 and 32 are optical elements having a substrate on which a wavelength-selection film is formed, the wavelength-selection film reflecting light within a predetermined wavelength range and transmitting light out of the predetermined wavelength range. Of the two dichroic mirrors 31 and 32, the dichroic mirror 31 disposed on the upstream of an optical path is a mirror that transmits the red light component and reflects the other color light components, and the dichroic mirror 32 disposed on the downstream of the optical path is a mirror that reflects the green light component and transmits the blue light component.

The relay optical system 35 has an incident-side lens 36, a relay lens 38, and reflecting mirrors 37 and 39, and guides the blue light component, having passed through the dichroic mirror 32 of the color-separation optical system 30, to the optical device 40. Further, the relay optical system 35 is provided on the optical path of the blue light in order to prevent the light utilization efficiency from being reduced due to light dispersion and the like, by considering that the optical path of the blue light is longer than those of the other color light components. Even though such arrangement is used in the present embodiment because of the longer optical path of the blue light, the optical path of the red light or the green light may alternatively be lengthened.

The red light component separated by the above-described dichroic mirror 31 is bent by the reflecting mirror 33 to be fed to the optical device 40 through a field lens 41. The green light component separated by the dichroic mirror 32 is directly fed to the optical device 40 through the field lens 41. The blue light is condensed, radiated, and bent by the lenses 36 and 38 and the reflecting mirrors 37 and 39 of the relay optical system 35 to be fed to the optical device 40 through the field lens 41. In addition, the field lenses 41 provided on the upstreams of the optical paths of the respective color light components of the optical device 40 convert the respective sub-beams emitted from the second lens array 22 into light parallel to the illumination optical axis IX.

The optical device 40 modulates the light incident thereon in accordance with image information so as to form a color image, which includes the liquid crystal panels 42 (42R, 42G, and 42B) serving as an optical modulator to be illuminated and a cross dichroic prism 43 serving as a color-combining optical system. Further, although not shown, incident-side polarizers are interposed between a field lens 41 and the respective liquid crystal panels 42R, 42G, and 42B, and emission-side polarizers are interposed between the respective liquid crystal panels 42R, 42G, and 42B and the cross dichroic prism 43. The incident-side polarizers, the liquid crystal panels 42R, 42G, and 42B, and the emission-side polarizers form a liquid crystal light valve (optical modulation unit) for modulating the respective color light components being incident thereon.

The liquid crystal panels 42R, 42G, and 42B are constructed by sealing liquid crystal (electro-optical material) between a pair of transparent glass substrates, which modulates the polarization direction of the polarized light in accordance with corresponding image signal, using, for instance, polysilicon TFT as a switching element. The image formation areas, in which the modulation is performed, of the liquid crystal panels 42R, 42G, and 42B have rectangular shape having diagonal dimension of, for example, 0.7 inch.

The cross dichroic prism 43 combines optical images, which are emitted from the emission-side polarizer and modulated for each color light, so as to form a color image. The cross dichroic prism 43 has approximately a square shape in plan view with four right-angle prisms attached to each other, and a pair of dielectric multi-layered films crossing to each other in approximately an X shape are formed on interfaces where the respective right-angle prisms are attached to each other. One of the dielectric multi-layered films reflects the red light and the other dielectric multi-layered film reflects the blue light. The red light and the blue light are bent by the dielectric multi-layered films so as to be aligned with the propagating direction of the green light, and thus the three color light components are combined.

Figure 2:
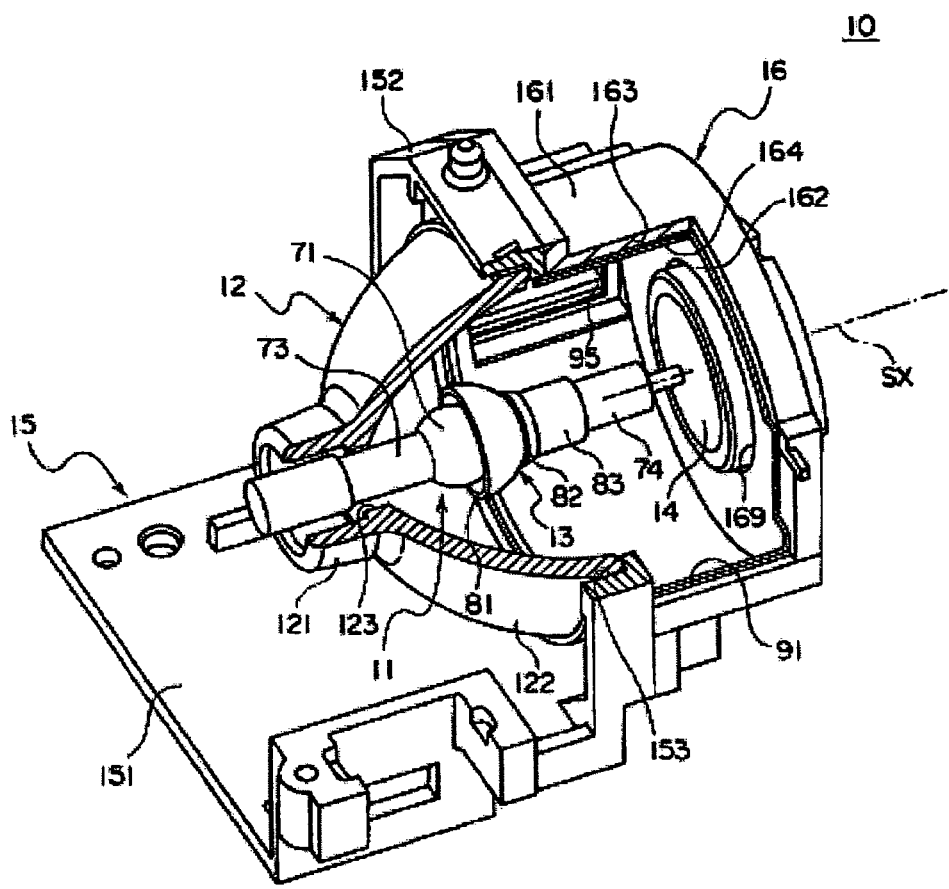
FIG. 2 is a perspective view illustrating a light source lamp unit of the projector shown in FIG. 1.

The color image emitted from the cross dichroic prism 43 is projected by the projection optical system 50 in an enlarged manner so as to form a large image on a screen not shown. FIG. 2 a perspective view illustrating the light source lamp unit 10 included in the projector of FIG. 1.

The light source lamp unit 10 includes a holder 16 for holding the parallelizing concave lens 14 and a lamp housing 15 for holding the main reflecting mirror 12 in addition to the above-described light source lamp 11, main reflecting mirror 12, sub-reflecting mirror 13, and parallelizing concave lens 14.

The light source lamp 11 serving as a light emitting tube is composed of a quartz glass tube whose central portion is spherically bulged, the central portion being a light emitting portion 71 and the portions extending on either side of the light emitting portion 71 being first and second sealed portions 73 and 74.

Any of a metal halide lamp, a high pressure mercury lamp, and a super high pressure mercury lamp is adopted as the light source lamp 11, and thus the lamp 11 emits light having high brightness and strong ultraviolet ray.

Figure 3:
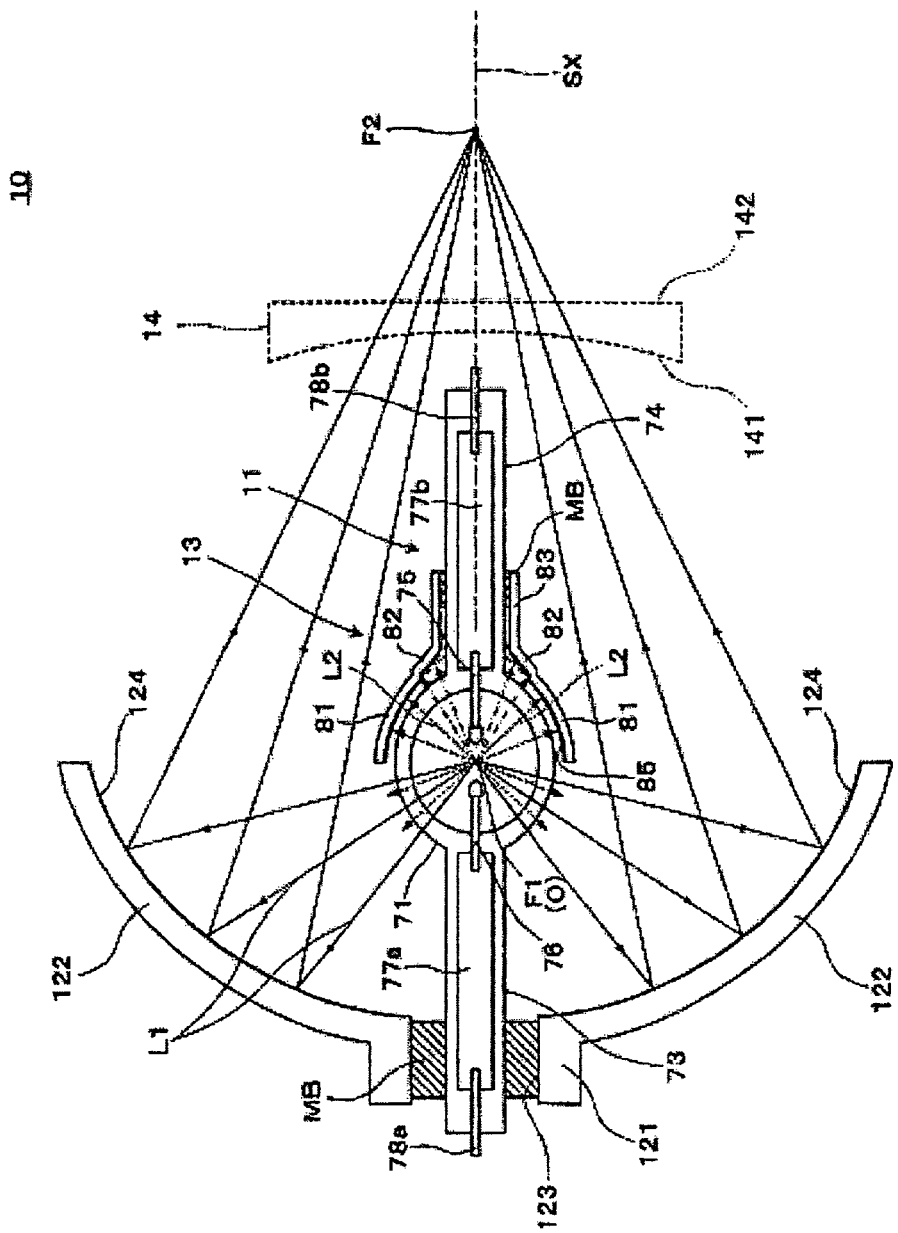
FIG. 3 is a conceptual view illustrating the optical structure of the light source lamp unit.

As shown in FIG. 3, a pair of tungsten electrodes 75 and 76 disposed to be spaced apart from each other by a predetermined distance, mercury, rare gas and a small quantity of halogen are sealed inside the light emitting portion 71.

Molybdenum-made metal foils 77a and 77b electrically connected to the electrodes 75 and 76 provided in the light emitting portion 71 are inserted into the sealed portions 73 and 74, respectively, and front end portions of the sealed portions 73 and 74 are sealed with glass material, etc. When a voltage is applied to lead wires 78a and 78b connected to the metal foils 77a and 77b, electric arc discharge occurs between the pair of electrodes 75 and 76 so that the light emitting portion 71 emits light.

The main reflecting mirror 12 is an integrally molded product made of a quartz glass and has a neck portion 121 to which the first sealed portion 73 of the light source lamp 11 is inserted and a main reflecting portion 122 having an ellipsoidal curved surface extending from the neck portion 121.

An inserting hole 123 is formed at the center of the neck portion 121, and the first sealed portion 73 is disposed at the inserting hole 123.

On the inner ellipsoidal curved glass surface of the main reflecting portion 122, a reflecting surface 124 is formed by a dielectric multi-layered film, serving as a reflection-enhancing film, coated by vapor deposition of a thin metal film. From a point of heat resistance, the reflecting surface 124 is preferably formed by alternate layers of, for example, tantalum compound and $SiO_2$, or hafnium compound and $SiO_2$, etc.

In addition, the reflecting surface 124 serves as a cold mirror that reflects the visible light and transmits the infrared ray and the ultraviolet ray.

The light source lamp 11 is disposed along an optical axis SX of the main reflecting portion 122 and is disposed such that a light emitting center O between the electrodes 75 and 76 inside the light emitting portion 71 is positioned at a first focus F1 of the ellipsoidal curved surface of the reflecting surface 124. When the light source lamp 11 is turned on, the light emitted from the light emitting portion 71 is reflected by the reflecting surface 124 to be a convergent light converging at a second focus F2 of the ellipsoidal curved surface.

In order to fix the light source lamp 11 to the main reflecting mirror 12, the first sealed portion 73 of the light source lamp 11 is inserted to the inserting hole 123 of the main reflecting mirror 12 so that the light emitting center O between the electrodes 75 and 76 in the light emitting portion 71 is located at the first focus F1 of the ellipsoidal curved surface of the reflecting surface 124, and inorganic adhesive MB having silica and alumina as main components is filled in the inserting hole 123. Here, the dimension of the reflecting portion 122 in the optical axis direction is shorter than the length of the light source lamp 11, so that the second sealed portion 74 on the front side of the light source lamp 11 in the light-emission direction protrudes from the light-emission opening of the main reflecting mirror 12 when the light source lamp 11 is fixed to the main reflecting mirror 12.

The sub-reflecting mirror 13 is a reflecting member covering substantially the front half of the light emitting portion 71 of the light source lamp 11 in the light-emission direction, the sub-reflecting mirror 13 being made of, for example, a low thermal expansion material such as quartz or Neoceram, or a high heat-conductive material such as light-transmissive alumina, sapphire, crystal, fluorite, and YAG. The sub-reflecting mirror 13 includes a sub-reflecting portion 81 which sends the light radiated from the light emitting portion 71 of the light source lamp 11 back to the light emitting portion 71, a base portion 82 which prevents the light radiated from the light emitting portion 71 from returning to the inside and the vicinity of the light emitting portion 71, and a supporting portion 83 which is fixed around the second sealed portion 74 while supporting the base portion 82.

An inner glass surface of the sub-reflecting portion 81 has a curved concave surface corresponding to a spherical surface of the light emitting portion 71, on which a reflecting surface 85 is formed. The reflecting surface 85 can be obtained by forming a dielectric multi-layered film, which is a reflection-enhancing film, in the same manner as the reflecting surface 124 of the main reflecting mirror 12. The reflecting surface 85 also serves as a cold mirror that reflects only the visible light and transmits the infrared ray and the ultraviolet ray. The base portion 82 of the sub-reflecting mirror 13 is a circular portion formed in a stepped manner with respect to the sub-reflecting portion 81, which is formed at a side of the second sealed portion 74 of the sub-reflecting portion 81, and the reflection characteristic of the base portion 82 is different from that of the sub-reflecting portion 81. That is, even though the dielectric multi-layered film is also formed on the inner surface of the base portion 82 as well as the sub-reflecting portion 81, the inner surface of the base portion 82 has a shape stepped with respect to the reflecting surface 85 of the sub-reflecting portion 81. Specifically, the inner surface of the base portion 82 is a strip-shaped reflecting surface which has a circular conical surface, a spherical surface, or the like, and the curvature of the inner surface of the base portion 82 is different from that of the reflecting surface 85 at a location deviating from a curved concave surface extending from the reflecting surface 85 of the sub-reflecting portion 81. Alternatively, the inner surface of the base portion 82 has the same curvature as the curved concave surface extending from the reflecting surface 85 of the sub-reflecting portion 81, but the inner surface of the base portion 82 has a center of curvature located at a different place from that of the reflecting surface 85 or the extending surface. Thus, the base portion 82 reflects light incident thereon so as to deviate from the inside of the light emitting portion 71 and the vicinity of the light emitting portion 71. In other words, the light emitted from the light emitting portion 71 to be incident on the base portion 82 do not return to the inside of the light emitting portion 71, but, for example, propagate toward the supporting portion 83 to be emitted to the outside. In addition, even when the light emitted from the light emitting portion 71 return to the inside of the light emitting portion 71 by the base portion 82, most of the light pass through the inside of the light emitting portion 71, so that there is some returned light being incident on the electrodes 75 and 76. As a result, it is possible to prevent the temperature of the light emitting portion 71 from rising and the electrodes 75 and 76 from being deteriorated, which extends the lifetime of the light source lamp 11.

Further, when the sub-reflecting mirror 13 is a spherical reflecting mirror formed by extending the sub-reflecting portion 81, without providing the base portion 82 described above, light, which are emitted from the light emitting portion 71 to be reflected from the spherical reflecting mirror, may illuminate the electrodes 75 and 76 in the light emitting portion 71. Of light emitted from the light emitting portion 71 toward the front side thereof in the light-emission direction, some of the light propagating in the direction of an angle 40° or less with respect to the optical axis SX are emitted to the outside through one end of the light emitting portion 71, that is, an end portion of the light emitting portion 71 adjacent to the second sealed portion 74. However, in the end portion, since the surface of the light emitting portion 71 is quite distant from the spherical surface and the light emitting portion 71 becomes gradually thick, it is not easy to control reflected light to return to the center of the light emitting portion 71. In addition, in a range from the end portion of the light-emitting portion 71 to the center of the light-emitting portion 71, the distance between the electrodes 75 and 76 becomes so narrow, which makes the tolerance for controlling the light to return to the center of the light emitting portion 71 very strict. Therefore, in the present embodiment, it is not considered that some of the light, emitted from the light emitting portion 71, propagating in the direction of an angle 40° or less with respect to the optical axis SX should return to the light emitting portion 71. Further, most of the light emitted in a relatively small angle range (angle direction of 20° to 40°) with respect to the optical axis SX do not return into the light emitting portion 71 due to the base portion 82 of the sub-reflecting mirror 13. As a result, it is possible to prevent the temperature of the light emitting portion 71 from rising and the electrodes 75 and 76 from being deteriorated, which extends the lifetime of the light source lamp 11.

The supporting portion 83 of the sub-reflecting mirror 13 is a cylindrical member having an internal diameter larger than the external diameter of the second sealed portion 74. In order to fix the sub-reflecting mirror 13 to the light source lamp 11, the second sealed portion 74 of the light source lamp 11 is inserted into the supporting portion 83, the light emitting center O between the electrodes 75 and 76 in the light emitting portion 71 is disposed to be located at a focus of the spherical surface of the reflecting surface 85, and inorganic adhesive MB having silica and alumina as main components is filled in the supporting portion 83.

Here, for the light radiated from the light source lamp 11, a light beam L1, which propagates toward the main reflecting mirror 12, of the light radiated from the light emitting center O of the light emitting portion 71, is reflected by the reflecting surface 124 of the main reflecting mirror 12 to be emitted toward the second focus F2.

Further, a light beam L2, which is radiated from the light emitting center O of the light emitting portion 71 toward a side opposite to the main reflecting mirror, is reflected by the reflecting surface 85 of the sub-reflecting mirror 13, then passes through the light emitting center O of the light emitting portion 71 to propagate toward the main reflecting mirror 12, and then is reflected by the reflecting surface 124 of the main reflecting mirror 12 to be emitted from the main reflecting mirror 12 so as to converge at the second focus F2. That is, by preparing the sub-reflecting mirror 13, light radiated from the light emitting portion 71 toward the side (front side of the light emitting portion 71 in the light-emission direction) opposite to the main reflecting mirror 12 can converge at the second focus F2 of the main reflecting mirror 12, in the same manner as light which are radiated to be directly incident on the reflecting surface 124 of the main reflecting mirror 12 from the light source lamp 11.

At this time, since the light incident on the base portion 82 are reflected by the sub-reflecting mirror 13 to deviate from the inside of the light emitting portion 71 and the vicinity thereof, there is some of light incident on the electrodes 75 and 76. As a result, it is possible to prevent the temperature of the light emitting portion 71 from rising and the electrodes 75 and 76 from being deteriorated, which extends the lifetime of the light source lamp 11, as described above.

Further, by providing the sub-reflecting mirror 13, since most of the light emitted from the light emitting portion 71 can converge at the second focus F2 regardless of the size of the main reflecting portion 122 provided in the main reflecting mirror 12, it is possible to make small the length of the main reflecting mirror 12 in the optical axis direction and the radius of an opening thereof. Thereby, the light source lamp unit 10 and the projector 1 can be made small, and accordingly, a layout where the light source lamp unit 10 is incorporated in the projector 1 becomes easy.

Furthermore, by providing the sub-reflecting mirror 13, even if the first focus F1 and the second focus F2 of the main reflecting mirror 12 are positioned to be closer to each other so as to make the diameter of a light condensing spot at the second focus F2 small, almost all of the light radiated from the light emitting portion 71 converge at the second focus F2 by the main reflecting mirror 12 and the sub-reflecting mirror 13 so as to be available, and thus the light utilization efficiency can be greatly improved.

As a result, the light source lamp 11 with relatively low output can be employed, and thus the temperatures of the light source lamp 11 and the light source lamp unit 10 can be lowered. The parallelizing concave lens 14 parallelizes light which are radiated from the light source lamp 11 and are converged by the main reflecting mirror 12. Here, a beam-incident surface 141 of the parallelizing concave lens 14 is an aspherical surface, for example, a concave surface of a hyperboloid, and a beam-emission surface 142 is a flat surface.

Figure 4A:
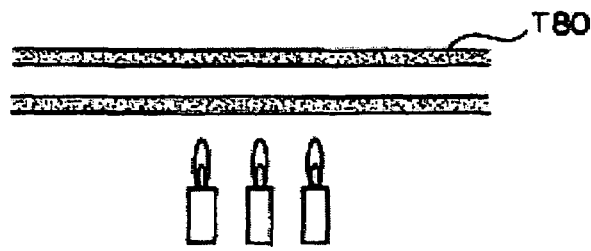
FIGS. 4A to 4C are views illustrating a method of manufacturing a sub-reflecting mirror of the light source lamp unit.
Figure 4B:
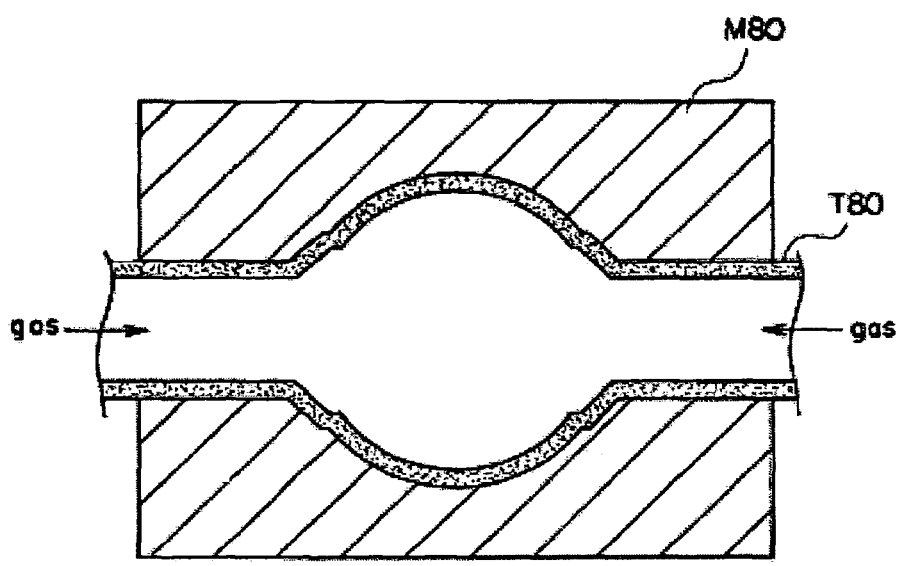
Figure 4C:
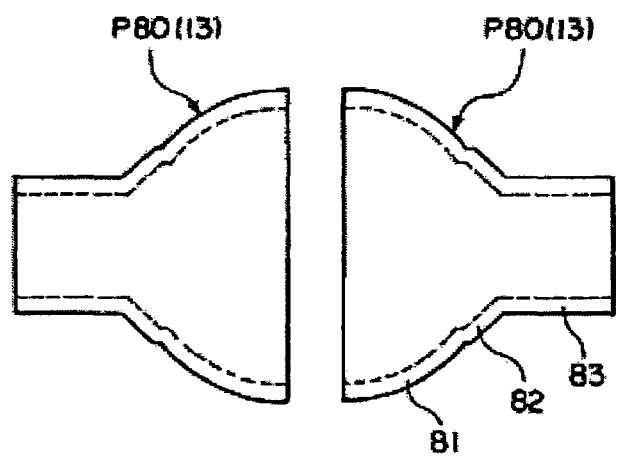

A film having subjected to an anti-reflection coating (AR coating) process is formed on the beam-incident surface 141 of the parallelizing concave lens 14. Thereby, the light utilization efficiency can be improved. In addition, an ultraviolet protection film is formed on the beam-emission surface 142 of the parallelizing concave lens 14. The ultraviolet protection film reflects the ultraviolet ray so as to avoid the transmission of the ultraviolet ray, and thus it is possible to prevent the ultraviolet ray from being emitted from the light source lamp unit 10. FIGS. 4A to 4C are views explaining a preferable method of manufacturing the sub-reflecting mirror 13 used in the light source lamp unit 10.

The sub-reflecting mirror 13 is manufactured by using an air-pressure molding method, which includes a first process in which a part of a tube T80 made of a material for the sub-reflecting mirror 13 is heated as shown in FIG. 4A, a second process in which the tube T80 heated in the first process is put into a molding tool M80 and a central portion of the tube T80 is inflated by an internal pressure due to an inert gas so that a part of the inflated inner surface has a predetermined shape (specifically, a shape corresponding to the base portion 82 of the sub-reflecting mirror 13, the reflection surface 85 of the sub-reflecting portion 81, or the like) as shown in FIG. 4B, a third process in which the tube T80 is cut into the central portion and two end portions so as to form two sub-reflecting mirror members P80 as shown in FIG. 4C, and a fourth process (not shown) in which a dielectric multi-layered film made of, for example, $TiO_2$ or $SiO_2$, is formed on the inner surface of each of the sub-reflecting mirror members P80 by using a deposition method, a sputtering method, or a CVD method, thereby completing the sub-reflecting mirror 13. In the manufacturing method, a hard glass or a quartz glass is preferably used for a material of the tube T80, and in particular, the quartz glass is more preferable. The reason is that the coefficient of thermal expansion of the quartz glass is low and the quartz glass does not deform internally, so that it is not necessary to perform an annealing process.

The sub-reflecting mirror 13 manufactured by the above-described method has the circular base portion 82 between the sub-reflecting portion 81 and the supporting portion 83, and the sub-reflecting portion 81 and the base portion 82 have different reflection characteristics from each other. As described above, the base portion 82 reflects the light emitted from the light emitting portion 71 of the light source lamp 11 so as to deviate from the light emitting portion 71 and the vicinity thereof According to the method of manufacturing the sub-reflecting mirror 13 shown in FIGS. 4A to 4C, it is possible to easily provide the base portion 82, which has a predetermined inner shape and has a different reflection characteristic, for the sub-reflecting mirror 13. Further, since it is not necessary to prepare another molding tool for forming the inner reflecting surface of the sub-reflecting mirror 13, the surface state of the molding tool M80 is not easily deteriorated, which does not allow the characteristic of the reflecting surface of the sub-reflecting mirror 13 to be easily deteriorated. Furthermore, according to the manufacturing method, since the inner surface of the sub-reflecting mirror member P80 is in contact with only the inert gas, it is possible for the sub-reflecting mirror 13 to obtain a smooth reflecting surface whose roughness is very small. In addition, according to the manufacturing method, since the sub-reflecting mirror 13 can be made very thin, it is possible to reduce to the minimum the rate that the outer surface of the sub-reflecting mirror 13 blocks the light reflected by the main reflecting mirror 12.

Referring back to FIG. 2, the lamp housing 15 of the light source lamp unit 10 is an integrally molded product, made of synthetic resin, having substantially an L-shaped cross section, and has a horizontal portion 151 and a vertical portion 152.

The horizontal portion 151 is engaged with a wall of the optical component casing 2 (refer to FIG. 1) so as to prevent light leakage by hiding the light source lamp unit 10 in the optical component casing 2. Further, although not shown, a terminal block for electrically connecting the light source lamp 11 to an external power source is provided on the horizontal portion 151, and the terminal block is connected to the lead wires 78a and 78b connected to the light source lamp 11.

The vertical portion 152 determines the position of the main reflecting mirror 12 in the optical axis direction, and a front end of the main reflecting mirror 12 on the light-emission opening side is fixed to the vertical portion 152 by mechanical pressing or an adhesive, etc. An opening portion 153 is formed on the vertical portion 152 along an edge of the main reflecting mirror 12 on the light-emission opening.

The horizontal portion 151 and the vertical portion 152 are formed with projections and dents, and these projections and dents are respectively engaged with dents and projections formed in the optical component casing 2, so that the optical axis SX of the main reflecting portion 122 and the illumination optical axis IX of the optical component casing 2 are aligned and the light emitting center O of the light source lamp 11 is disposed on the illumination optical axis IX of the optical component casing 2.

The holder 16 has a cylindrical shape corresponding to the light-emission opening of the main reflecting mirror 12, and the holder 16 is bonded and fixed to the vertical portion 152 from the opposite side of the main reflecting mirror 12 so as to hold an outer periphery of the parallelizing concave lens 14.

The holder 16 has a double structure formed of a holder body 163 provided on the outer side and an absorber 164 provided on the inner side thereof.

The outer holder body 163 is made by injection molding of synthetic resin, such as polyphenylene sulfide (PPS), Vectra (LCP) and is composed of an integrally-molded cylinder portion 161 and a holding portion 162. The cylinder portion 161 covers the light source lamp 11 therein. The holding portion 162 is provided so as to close the light-emission side of the cylinder portion 161, and has an opening 169 with which the parallelizing concave lens 14 is engaged.

The inner absorber 164 can be made of a variety of materials capable of shielding light emitted from the light source lamp 11 toward the holder body 163 and of absorbing light with low reflectivity. In order to carry the light-shielding property while keeping the low reflectivity, the absorber 164 should employ as a substrate a metal plate made of, for example, aluminum, magnesium, titan, iron, copper, or alloy thereof, the inner surface of which can be roughed by performing black alumite treatment, chemical machining, or etching.

Further, even though the reflectivity of a pure substrate of aluminum is approximately 80%, the reflectivity can be kept to be approximately 20% or less by performing the black alumite treatment, so that the light being incident on the absorber 164 can be reliably absorbed and shielded.

By the corrosion resistivity and light-absorbing capability based on the black alumite treatment for the absorber 164, the holder body 163 is protected, so that the thermal deterioration and generation of harmful gases such as siloxane can be avoided.

In addition, since the absorber 164 allows the holder 16 to have thermal resistance as a whole, choices of materials for the holder body 163 can be broadened, which results in reducing weight and cost and facilitating molding of the holder body 163.

However, as described above, only visible light of the light emitted from the light source lamp 11 is reflected by the main reflecting mirror 12 and the sub-reflection mirror 13 to converge at the second focus F2, which is different from the infrared ray and the ultraviolet ray included in the light emitted from the light source lamp 11.

In other words, the infrared ray and the ultraviolet ray emitted from the light source lamp 11 toward the main reflecting mirror 12 pass through a base material of the main reflecting mirror 12 to be emitted to the outside of the light source lamp unit 10. Thereby, heat escapes to the back side of the main reflecting mirror 12, and thus the light source lamp 11 can be protected from the infrared ray and the ultraviolet ray which are heat rays. In addition, the infrared ray and the ultraviolet ray having passed through the main reflecting mirror 12 are shielded by the optical component casing 2 covering the light source lamp unit so as not to leak toward the outside.

On the other hand, the infrared rays emitted from the light source lamp 11 toward the sub-reflection mirror 13 side pass through the sub-reflection mirror 13, but the emission direction is covered with the holder 16. Therefore, the infrared rays do not leak to the outside of the light source lamp unit 10. Since most of the infrared rays shielded by the holder 16 are absorbed by the absorber 164 provided on the inner side of the holder 16, reflection toward the light source lamp 11 can be sufficiently reduced. Thus, it is possible to prevent the light source lamp 11 from being overheated, which is effective for keeping the light source lamp 11 in the low temperature. In addition, the ultraviolet rays emitted from the light source lamp 11 toward the sub-reflecting mirror 13 side are absorbed by the absorber 164 in the same manner as the infrared rays described above.

An intake port 91 is formed on one side of the cylinder portion 161 of the holder 16 and an exhaust port 95 is formed on the other side thereof by cutting off rectangular portions from the holder body 163. Thus, it is possible to secure a cooling path passing through the holder 16 and the main reflecting mirror 12. The intake port 91 and the exhaust port 95 are provided with a mesh (not shown) so that broken pieces of the light source lamp 11 do not fly in all directions when the light source lamp 11 explodes.

Second Embodiment

Figure 5:
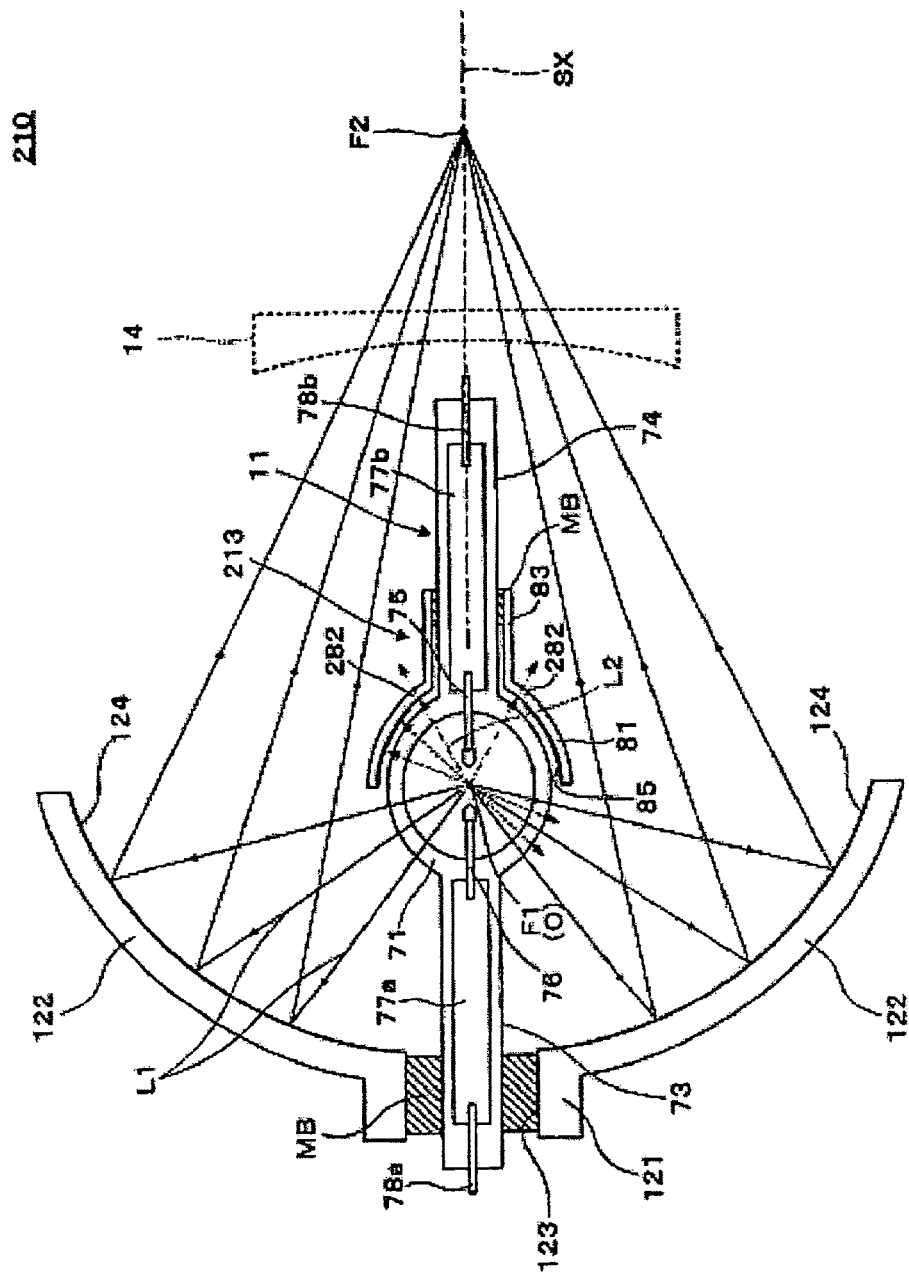
FIG. 5 is a view illustrating a light source lamp unit in a second embodiment.

FIG. 5 is a view illustrating a light source lamp unit 210 according to a second embodiment. The light source lamp unit 210 is included in the projector 1 according to the first embodiment shown in FIG. 1 instead of the light source lamp unit 10. The light source lamp unit 210 has the same structure as the light source lamp unit 10 of the first embodiment with respect to parts not specifically described, and like numbers refer to like elements in the first embodiment and the description thereof is accordingly omitted.

In the light source lamp unit 210 of the present embodiment, a sub-reflecting mirror 213 has a base portion 282 made of a transparent material. The inner surface of the base portion 282 is a spherical surface extending from the sub-reflecting portion 81, but only the inner surface of the sub-reflecting portion 81 is formed with the reflecting surface 85. Specifically, light emitted from the light emitting portion 71 to be incident on the sub-reflecting portion 81 are incident on the light emitting center O of the light emitting portion 71 and the vicinity thereof as returned light, while light emitted from the light emitting portion 71 to be incident on the base portion 282 pass through the base portion 282 to be incident on the absorber 164 (refer to FIG. 2 in the first embodiment) provided on the inner side of the holder 16. That is, since the light emitted from the light emitting portion 71 to be incident on the base portion 282 close to the second sealed portion 74 pass through the base portion 282 so as not to be returned, the returned light can be prevented from being incident on the electrodes 75 and 76 in the light emitting portion 71. As a result, since it is possible to prevent the temperature of the light emitting portion 71 from rising and the electrodes 75 and 76 from being deteriorated, it is possible to extend the lifetime of the light source lamp 11.

Further, since the base portion 282 transmits incident light without the dielectric multi-layered film, it is not necessary to form the inner surface of the base portion 282 in a spherical shape. The inner surface of the base portion 282 may be, for example, a circular conical surface or a curved surface, or may have a stepped shape in the same manner as in the first embodiment. In addition, as a material of the base portion 282, it is possible to use the same material (for example, quartz glass) as in the first embodiment if the material is a light-transmissive one. Moreover, the base portion 282 of the present embodiment may have a construction in which a base of the sub-reflecting mirror 213 is made of a light-transmissive material and the dielectric multi-layered film is not formed on the inner surface of the base portion 282, or a construction in which a part of the base portion 282 made of a light-transmissive material is connected between the sub-reflecting portion 81 and the supporting portion 83.

Hereinafter, a method of manufacturing the sub-reflecting mirror 213 of the present embodiment will be described by way of an example. The method of manufacturing the sub-reflecting mirror 213 is similar to the method of manufacturing the sub-reflecting mirror 13 shown in FIGS. 4A to 4C in the first embodiment. That is, even though the sub-reflecting mirror 213 of the present embodiment is preferably manufactured by using the air-pressure molding method, the sub-reflecting mirror 213 does not have unevenness corresponding to the base portion 282 because the surface of the molding tool M80 used in the process of FIG. 4C is smooth. Further, when the dielectric multi-layered film is formed on the inner surface of the sub-reflecting mirror member P80, a mask is provided to correspond to the base portion 282 so as to prevent a reflecting surface from being formed on the inner surface of the base portion 282.

Third Embodiment

Figure 6:
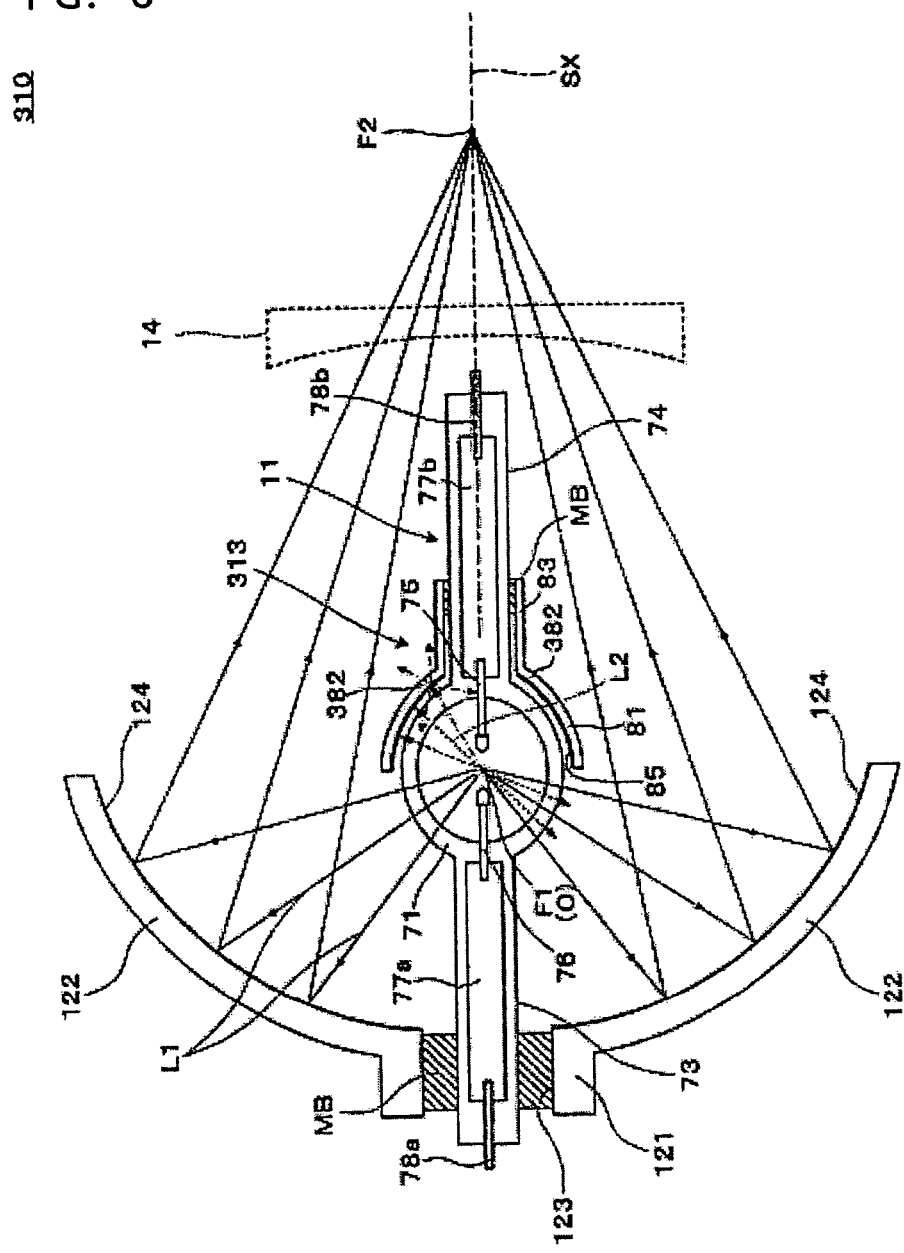
FIG. 6 is a view illustrating a light source lamp unit in a third embodiment.

FIG. 6 is a view illustrating a light source lamp unit 310 according to a third embodiment. The light source lamp unit 310 is included in the projector 1 according to the first embodiment shown in FIG. 1 instead of the light source lamp unit 10. The light source lamp unit 310 has the same structure as the light source lamp unit 10 of the first embodiment with respect to parts not specifically described.

In the light source lamp unit 310 of the present embodiment, a sub-reflecting mirror 313 has a base portion 382 made of a light-diffusing material. The inner surface of the base portion 382 is a spherical surface extending from the sub-reflecting portion 81, but the inner surface of the base portion 382 is not a reflecting surface but a scattered surface having been subjected to a frost process. Specifically, light emitted from the light emitting portion 71 to be incident on the sub-reflecting portion 81 are incident on the light emitting center O of the light emitting portion 71 and the vicinity thereof as returned light, while light emitted from the light emitting portion 71 to be incident on the base portion 382 are scattered by the base portion 382. That is, some of the scattered light are radiated in a random manner so as to be transmitted through the base portion 382, and the others are reflected by the base portion 382 in a random manner so as to be emitted. Accordingly, light emitted from the light emitting portion 71 to be incident on the base portion 382 close to the second sealed portion 74 can be prevented from being returned light, and thus it is possible to prevent the returned light from being directly incident on the electrodes 75 and 76 in the light emitting portion 71. As a result, since it is possible to prevent the temperature of the light emitting portion 71 from rising and the electrodes 75 and 76 from being deteriorated, it is possible to extend the lifetime of the light source lamp 11.

Further, since the base portion 382 scatters the incident light without the dielectric multi-layered film, it is not necessary to form the inner surface of the base portion 382 in a spherical shape. The inner surface of the base portion 382 may be, for example, a circular conical surface or a curved surface, or may have a stepped shape in the same manner as in the first embodiment.

Furthermore, instead of the inner surface of the base portion 382, an outer surface of the base portion 382 may be the scattered surface. That is, the base portion 382 may be formed to include the outer surface or inner surface from which the incident light emitted from the light emitting portion 71 is scattered. Moreover, the base portion 382 of the present embodiment can be formed even in a structure in which a base of the sub-reflecting mirror 313 is made of a light-diffusing material and a reflecting surface (dielectric multi-layered film) is not formed on the inner surface of the base portion 382, a structure in which a part of the base portion 382 made of a light-diffusing material is connected between the sub-reflecting portion 81 and the supporting portion 83, or a structure in which a process of diffusing light is performed on at least one of the inner and outer surfaces of the base portion 382 no matter what the base material of the sub-reflecting mirror 313 is.

Hereinafter, a method of manufacturing the sub-reflecting mirror 313 of the present embodiment will be described by way of an example. The method of manufacturing the sub-reflecting mirror 313 is similar to the method of manufacturing the sub-reflecting mirror 13 shown in FIGS. 4A to 4C in the first embodiment. That is, even though the sub-reflecting mirror 313 of the present embodiment is preferably manufactured by using the air-pressure molding method, the sub-reflecting mirror 313 does not have unevenness corresponding to the base portion 382 because the surface of the molding tool M80 used in the process of FIG. 4C is smooth. Further, before the dielectric multi-layered film is formed on the inner surface of the sub-reflecting mirror member P80, a part of the inner surface corresponding to the base portion 382 is subjected to, for example, hydrofluoric acid treatment or sandblast treatment so as to make the surface an opaque glass surface. Furthermore, when the dielectric multi-layered film is formed on the inner surface of the sub-reflecting mirror member P80, a mask is provided to correspond to the base portion 382 so as to prevent a reflecting surface from being formed on the inner surface of the base portion 382.

While the invention has been described with reference to the embodiments, the invention is not limited thereto. For example, the reflecting surface 124 of the main reflecting mirror 12 or the reflecting surface 85 of the sub-reflecting mirror 13 is not limited to the ellipsoidal curved surface or the spherical surface, but may be various curved surfaces according to specifications, such as accuracy required for the light source lamp units 10, 210, and 310. Further, even though the two lens arrays 22 and 23 have been used in order to split light emitted from the light source lamp unit 10 into a plurality of sub-beams in the embodiments, the invention may be applied to a projector in which the lens arrays 22 and 23 are not used. In addition, the lens arrays 22 and 23 may be replaced by a load integrator.

Furthermore, even though the PBS array 23, which makes the light emitted from the light source lamp unit 10 polarized in a predetermined direction, has been used in the embodiments, the invention may be applied to a projector in which the PBS array 23 is not used.

Furthermore, even though the projector using three optical modulators has been described as an example in the embodiments, the invention may be applied to a projector using a single optical modulator, two optical modulators, or four or more optical modulators.

Furthermore, even though an example where the invention is applied to a transmissive projector has been described in the embodiments, the invention may be applied to a reflective projector. Here, the 'transmissive' means that a light valve including a liquid crystal panel transmits light, and the 'reflective' means that the light valve reflects the light. In the case of the reflective projector, since the light valve can be composed of only the liquid crystal panel, a pair of polarizers is not needed. In addition, the optical modulator is not limited to the liquid crystal panel, but an optical modulator using, for example, a micro mirror may be used.

Furthermore, a projector includes a front-type projector that projects an image from a direction where a projection surface is viewed and a rear-type projector that projects an image from a direction opposite to the direction where the projection surface is viewed. Here, the configuration of the projector 1 shown in FIG. 1 can be applied to both the front-type projector and the rear-type projector.

What is claimed is:

1. A light source device, comprising:
   a light emitting tube having a light emitting portion that generates light by an electric discharge between a pair of electrodes and first and second sealed portions provided on either side of the light emitting portion;
   a main reflecting mirror provided along a first sealed portion of the light emitting tube and having a main reflecting portion that reflects light radiated from the light emitting tube so as to converge at a predetermined position; and
   a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed to have a shape stepped with respect to the sub-reflecting portion, wherein
   the sub-reflecting mirror includes a supporting portion fixed around the second sealed portion; and
   the base portion is formed between the sub-reflecting portion and the supporting portion in a circular shape.

2. A light source device, comprising:
   a light emitting tube having a light emitting portion that generates light by an electric discharge between a pair of electrodes and first and second sealed portions provided on either side of the light emitting portion;

a main reflecting mirror provided along a first sealed portion of the light emitting tube and having a main reflecting portion that reflects light radiated from the light emitting tube so as to converge at a predetermined position; and a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed with a curved surface having curvature different from the sub-reflecting portion.

3. A light source device, comprising:

a light emitting tube having a light emitting portion that generates light by an electric discharge between a pair of electrodes and first and second sealed portions provided on either side of the light emitting portion;

a main reflecting mirror provided along a first sealed portion of the light emitting tube and having a main reflecting portion that reflects light radiated from the light emitting tube so as to converge at a predetermined position; and a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and formed with a curved surface having a center different from the sub-reflecting portion.

4. A light source device, comprising:

a light emitting tube having a light emitting portion that generates light by an electric discharge between a pair of electrodes and first and second sealed portions provided on either side of the light emitting portion;

a main reflecting mirror provided along a first sealed portion of the light emitting tube and having a main reflecting portion that reflects light radiated from the light emitting tube so as to converge at a predetermined position; and a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and transmitting light.

5. A light source device, comprising:

a light emitting tube having a light emitting portion that generates light by an electric discharge between a pair of electrodes and first and second sealed portions provided on either side of the light emitting portion;

a main reflecting mirror provided along a first sealed portion of the light emitting tube and having a main reflecting portion that reflects light radiated from the light emitting tube so as to converge at a predetermined position; and a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and diffusing light.

6. A light source device, comprising:

a light emitting tube having a light emitting portion that generates light by an electric discharge between a pair of electrodes and first and second sealed portions provided on either side of the light emitting portion;

a main reflecting mirror provided along a first sealed portion of the light emitting tube and having a main reflecting portion that reflects light radiated from the light emitting tube so as to converge at a predetermined position; and a sub-reflecting mirror provided along a second sealed portion of the light emitting tube and having a sub-reflecting portion and a base portion, the sub-reflecting portion sending light radiated from the light emitting tube toward a side opposite to the main reflecting mirror back to the light emitting portion of the light emitting tube, and the base portion being provided at a side of the second sealed portion of the sub-reflecting portion and preventing light radiated from the light emitting tube from being sent back to the light emitting portion and the vicinity thereof.

7. A projector, comprising:

the light source device according to claim 1;

an optical modulator that modulates light emitted from the light source device in accordance with inputted image information so as to form modulated light; and a projection optical system that projects the modulated light from the optical modulator as image light.

8. The light source device according to claim 2, the sub-reflecting mirror further including a supporting portion fixed around the second sealed portion; and the base portion being formed between the sub-reflecting portion and the supporting portion in a circular shape.

9. A projector, comprising:

the light source device according to claim 2;

an optical modulator that modulates light emitted from the light source device in accordance with inputted image information so as to form modulated light; and a projection optical system that projects the modulated light from the optical modulator as image light.

10. The light source device according to claim 3, the sub-reflecting mirror further including a supporting portion fixed around the second sealed portion; and the base portion being formed between the sub-reflecting portion and the supporting portion in a circular shape.

11. A projector, comprising:

the light source device according to claim 3;

an optical modulator that modulates light emitted from the light source device in accordance with inputted image information so as to form modulated light; and a projection optical system that projects the modulated light from the optical modulator as image light.

12. The light source device according to claim 4, the sub-reflecting mirror further including a supporting portion fixed around the second sealed portion; and the base portion being formed between the sub-reflecting portion and the supporting portion in a circular shape.

13. A projector, comprising:
the light source device according to claim 4;
an optical modulator that modulates light emitted from the light source device in accordance with inputted image information so as to form modulated light; and
a projection optical system that projects the modulated light from the optical modulator as image light.

14. The light source device according to claim 5,
the sub-reflecting mirror further including a supporting portion fixed around the second sealed portion; and
the base portion being formed between the sub-reflecting portion and the supporting portion in a circular shape.

15. A projector, comprising:
the light source device according to claim 5;
an optical modulator that modulates light emitted from the light source device in accordance with inputted image information so as to form modulated light; and
a projection optical system that projects the modulated light from the optical modulator as image light.

16. The light source device according to claim 6,
the sub-reflecting mirror further including a supporting portion fixed around the second sealed portion; and
the base portion being formed between the sub-reflecting portion and the supporting portion in a circular shape.

17. A projector, comprising:
the light source device according to claim 6;
an optical modulator that modulates light emitted from the light source device in accordance with inputted image information so as to form modulated light; and
a projection optical system that projects the modulated light from the optical modulator as image light.

* * * * *